United States Patent
Tock et al.

(10) Patent No.: US 9,130,936 B2
(45) Date of Patent: Sep. 8, 2015

(54) METHOD AND SYSTEM FOR PROVIDING SECURE ACCESS TO PRIVATE NETWORKS

(75) Inventors: Theron Tock, Mountain View, CA (US); Zeqing Xia, Los Altos, CA (US)

(73) Assignee: Pulse Secure, LLC, San Jose, CA (US)

( * ) Notice: Subject to any disclaimer, the term of this patent is extended or adjusted under 35 U.S.C. 154(b) by 34 days.

(21) Appl. No.: 12/572,656

(22) Filed: Oct. 2, 2009

(65) Prior Publication Data
US 2010/0049795 A1 Feb. 25, 2010

Related U.S. Application Data

(62) Division of application No. 10/456,354, filed on Jun. 5, 2003, now Pat. No. 7,620,719.

(60) Provisional application No. 60/387,146, filed on Jun. 6, 2002.

(51) Int. Cl.
*G06F 15/177* (2006.01)
*H04L 29/06* (2006.01)
*H04L 29/08* (2006.01)

(52) U.S. Cl.
CPC .......... *H04L 63/10* (2013.01); *H04L 29/06108* (2013.01); *H04L 63/168* (2013.01); *H04L 67/2804* (2013.01); *H04L 67/2814* (2013.01); *H04L 67/2819* (2013.01)

(58) Field of Classification Search
CPC ................. H04L 29/06108; H04L 29/06965; H04L 67/28–67/2814
USPC .......... 709/203, 217–219, 225–226, 232–237
See application file for complete search history.

(56) References Cited

U.S. PATENT DOCUMENTS

| | | | |
|---|---|---|---|
| 5,491,752 A | 2/1996 | Kaufman et al. | |
| 5,586,260 A | 12/1996 | Hu | |
| 5,649,099 A | 7/1997 | Theimer et al. | |
| 5,752,022 A | 5/1998 | Chiu et al. | |
| 5,796,952 A * | 8/1998 | Davis et al. | 709/224 |
| 5,799,318 A | 8/1998 | Cardinal et al. | |

(Continued)

FOREIGN PATENT DOCUMENTS

| | | |
|---|---|---|
| EP | 0 855 659 A1 | 7/1998 |
| EP | 0 967 765 A2 | 2/1999 |

(Continued)

OTHER PUBLICATIONS

Rescorla et al., "The Secure Hypertext Transfer Protocol," Network Working Group, RFC 2660, Aug. 1999.*

(Continued)

*Primary Examiner* — Brendan Higa
(74) *Attorney, Agent, or Firm* — Fenwick & West LLP (57) ABSTRACT

Improved approaches for providing secure remote access to resources maintained on private networks are disclosed. According to one aspect, predetermined elements, such as applets, can be modified to redirect all communications to and from an application server through an intermediate server. The intermediate server in turn communicates with the application servers. According to another aspect, a communication framework can be provided to funnel communication between an applet and a server through a communication layer so as to provide managed and/or secured communications there between.

21 Claims, 7 Drawing Sheets

(56) References Cited

U.S. PATENT DOCUMENTS

| | | | |
|---|---|---|---|
| 5,812,769 A | 9/1998 | Graber et al. | |
| 5,826,014 A | 10/1998 | Coley et al. | |
| 5,826,242 A | 10/1998 | Montulli | |
| 5,898,836 A | 4/1999 | Freivald et al. | |
| 5,935,212 A | 8/1999 | Kalajan et al. | |
| 5,948,066 A | 9/1999 | Whalen et al. | |
| 5,978,842 A | 11/1999 | Noble et al. | |
| 5,983,268 A | 11/1999 | Freivald et al. | |
| 5,987,523 A * | 11/1999 | Hind et al. | 709/245 |
| 5,991,878 A | 11/1999 | McDonough et al. | |
| 6,006,258 A | 12/1999 | Kalajan | |
| 6,012,087 A | 1/2000 | Freivald et al. | |
| 6,029,182 A | 2/2000 | Nehab et al. | |
| 6,052,716 A | 4/2000 | Gibson | |
| 6,052,730 A | 4/2000 | Felciano et al. | |
| 6,073,163 A | 6/2000 | Clark et al. | |
| 6,112,246 A * | 8/2000 | Horbal et al. | 709/230 |
| 6,141,686 A | 10/2000 | Jackowski et al. | |
| 6,158,011 A | 12/2000 | Chen et al. | |
| 6,167,438 A | 12/2000 | Yates et al. | |
| 6,182,141 B1 | 1/2001 | Blum et al. | |
| 6,182,142 B1 | 1/2001 | Win et al. | |
| 6,185,598 B1 | 2/2001 | Farber et al. | |
| 6,199,104 B1 | 3/2001 | Delph | |
| 6,202,156 B1 | 3/2001 | Kalajan | |
| 6,205,481 B1 | 3/2001 | Heddaya et al. | |
| 6,208,975 B1 | 3/2001 | Bull et al. | |
| 6,230,002 B1 | 5/2001 | Floden et al. | |
| 6,260,187 B1 | 7/2001 | Cime | |
| 6,263,064 B1 | 7/2001 | O'Neal et al. | |
| 6,266,681 B1 | 7/2001 | Guthrie | |
| 6,286,029 B1 | 9/2001 | Delph | |
| 6,289,333 B1 | 9/2001 | Jawahar et al. | |
| 6,298,356 B1 | 10/2001 | Jawahar et al. | |
| 6,304,908 B1 | 10/2001 | Kalajan | |
| 6,356,934 B1 | 3/2002 | Delph | |
| 6,389,462 B1 | 5/2002 | Cohen et al. | |
| 6,389,473 B1 * | 5/2002 | Carmel et al. | 709/231 |
| 6,401,077 B1 | 6/2002 | Godden et al. | |
| 6,442,590 B1 * | 8/2002 | Inala et al. | 709/204 |
| 6,466,966 B1 | 10/2002 | Kirsch et al. | |
| 6,490,602 B1 | 12/2002 | Kraemer | |
| 6,499,108 B1 | 12/2002 | Johnson | |
| 6,505,230 B1 | 1/2003 | Mohan et al. | |
| 6,510,464 B1 | 1/2003 | Grantges et al. | |
| 6,532,493 B1 | 3/2003 | Aviani et al. | |
| 6,542,908 B1 | 4/2003 | Ims | |
| 6,567,857 B1 | 5/2003 | Gupta et al. | |
| 6,591,305 B2 | 7/2003 | Densmore | |
| 6,598,081 B1 | 7/2003 | Coile et al. | |
| 6,598,167 B2 | 7/2003 | Devine et al. | |
| 6,654,814 B1 | 11/2003 | Britton et al. | |
| 6,665,867 B1 | 12/2003 | Ims et al. | |
| 6,671,724 B1 | 12/2003 | Pandya et al. | |
| 6,675,193 B1 * | 1/2004 | Slavin et al. | 709/200 |
| 6,681,327 B1 | 1/2004 | Jardin | |
| 6,691,230 B1 | 2/2004 | Bardon | |
| 6,748,385 B1 | 6/2004 | Rodkin et al. | |
| 6,826,594 B1 | 11/2004 | Pettersen | |
| 6,950,935 B1 | 9/2005 | Allavarpu et al. | |
| 6,983,381 B2 | 1/2006 | Jerdonek | |
| 7,047,485 B1 | 5/2006 | Klein et al. | |
| 7,085,739 B1 | 8/2006 | Winter et al. | |
| 7,085,817 B1 | 8/2006 | Tock et al. | |
| 7,171,473 B1 * | 1/2007 | Eftis et al. | 709/227 |
| 7,185,360 B1 | 2/2007 | Anton et al. | |
| 7,376,741 B1 * | 5/2008 | Carter et al. | 709/228 |
| 7,461,150 B1 * | 12/2008 | Boulia | 709/227 |
| 7,562,147 B1 * | 7/2009 | Cohen | 709/228 |
| 7,620,719 B2 | 11/2009 | Tock et al. | |
| 7,769,871 B2 * | 8/2010 | Boulia | 709/227 |
| 2001/0034016 A1 * | 10/2001 | Ziv-el et al. | 434/350 |
| 2001/0047421 A1 | 11/2001 | Sridhar et al. | |
| 2001/0055492 A1 * | 12/2001 | Wood et al. | 399/8 |
| 2001/0056500 A1 | 12/2001 | Farber et al. | |
| 2002/0007393 A1 | 1/2002 | Hamel | |
| 2002/0040395 A1 * | 4/2002 | Davis et al. | 709/224 |
| 2002/0052932 A1 * | 5/2002 | Curtis et al. | 709/218 |
| 2002/0053034 A1 * | 5/2002 | Mizukoshi | 713/201 |
| 2002/0073155 A1 | 6/2002 | Anupam et al. | |
| 2002/0083342 A1 | 6/2002 | Webb et al. | |
| 2002/0133549 A1 | 9/2002 | Warrier et al. | |
| 2002/0174174 A1 | 11/2002 | Ramraj et al. | |
| 2003/0005187 A1 * | 1/2003 | King-Smith et al. | 710/12 |
| 2003/0014489 A1 * | 1/2003 | Inala et al. | 709/204 |
| 2003/0051161 A1 | 3/2003 | Smith et al. | |
| 2003/0065741 A1 * | 4/2003 | Vo | 709/217 |
| 2003/0065791 A1 | 4/2003 | Garg et al. | |
| 2003/0225889 A1 * | 12/2003 | Moutafov | 709/227 |
| 2004/0073566 A1 | 4/2004 | Trivedi | |
| 2005/0021762 A1 | 1/2005 | Gbadegesin | |
| 2005/0060725 A1 | 3/2005 | D'Souza et al. | |
| 2010/0011115 A1 * | 1/2010 | Kliland et al. | 709/230 |

FOREIGN PATENT DOCUMENTS

| | | |
|---|---|---|
| EP | 1 039 396 A2 | 9/2000 |
| WO | WO 99/66385 | 12/1999 |
| WO | WO 99/66385 A2 | 12/1999 |
| WO | WO 00/11832 | 3/2000 |
| WO | WO 00/11832 A1 | 3/2000 |
| WO | WO0180036 A1 | 10/2001 |

OTHER PUBLICATIONS

Supplementary European Search Report issued for European Patent Application No. PCT/US0317934 on May 4, 2010, 5 pages.
Co-pending U.S. Appl. No. 10/456,354, filed Jun. 5, 2003; Theron Tock et al., entitled "Method and System for Providing Secure Access to Private Networks".
NetMind, "Products: Free Mind-it Service," Information Datasheet, Netmind, http://www.netmind.com/html/free_mind-it_service.html, downloaded Jul. 4, 2000, pp. 1-2.
NetMind, "Products: Tracking," Information Datasheet, Netmind, http://www.netmind.com/html/products_tracking.html, downloaded Jul. 4, 2000, pp. 1-2.
Yahoo! Companion, "What is the Stock Market Toobar?," Information Datasheet, Yahoo! Inc, http://docs.companion.yahoo.com/companion/learnmore_s_companion.html, downloaded Nov. 3, 2000, pp. 1-6.
Yahoo! Companion, "What is Yahoo! Companion?," Information Datasheet, Yahoo! Inc., http://docs.companion.yahoo.com/companion/learnmore_companion.html, downloaded Nov. 3, 2000, pp. 1-4.
Yahoo! Companion, "Yahoo! Content and features on your browser! ," Information Datasheet, Yahoo! Inc., http://edit.yahoo./com/config/download_companion, downloaded Nov. 3, 2000, p. 1.
Desktop.com, "Welcome to Desktop.com!," Information Datasheet, http://www.desktop.com/, downloaded Sep. 26, 2000, p. 1.
Google, Business Development, "Google's advanced search Features," Information Datasheet, Google Inc., http://www.google.com/adv_features.html, downloaded Sep. 4, 2000, pp. 1 -2.
Anonyrnizer.com, Online Privacy Services, Information Datasheet, http://www.anonymizer.com/, downloaded Sep. 26, 2000, p. 1.
Anonyrnizer.com, Online Privacy Services, Information Datasheet, http://www.anonymizer.com/services/index.shtml, downloaded Sep. 26, 2000, pp. 1-4.
AltaVista, "Translations," Information Datasheet, AltaVista Company, http://babelfish.altavista.com/translate.dyn, downloaded Sep. 4, 2000, p. 1.
"My AltaVista: How to Use Babel Fish—What is AltaVista Babel Fish?" Information Datasheet, AltaVista Company, http://live.altavista.com/s?spage=help/bf_what.htdm, downloaded on Sep. 4, 2000, pp. 1-2.
Ray Hunt, "Internet/Intranet Firewall Security—Policy, Architecture and Transaction Services," Computer Communications, Butterworths and Co. Publishers Ltd., GB, vol. 21, No. 13, Sep. 1, 1998, pp. 1107-1123.
Barrett et al., "Intermediaries: new places for producing and manipulating Web content," Computer Networks and ISDN Systems 30 (1998), pp. 509-518.

(56) References Cited

OTHER PUBLICATIONS

Co-pending U.S. Appl. No. 09/706,297, filed Nov. 3, 2000; Theron Tock et al., "Method and System for Modifying Script Portions of Requests for Remote Resources".
Co-pending U.S. Appl. No. 10/060,792, filed Jan. 29, 2002; Theron Tock et al., entitled "Method and System for Providing Secure Access to Private Networks".
Eich, Brendan et al., Netscape Navigator, Netscape Navigation Corporation, 1996, pp. 24, 210.
The Microsoft Computer Directory, 5$^{th}$ ed., Redmond, WA: Microsoft Press, May 1, 2002.
Raggert, D., 1997, HTML 3.2 Reference Specification, W3C Recommendation, http://www.w3.org/TR/REC-html32.
Sun Microsystems, "The Applet Tag," http://java.sun.com/j2se/1.4.2/docs/guide.misc.applet.html.
Mary Campione and Kathy Walrath, 1997, "The Java Tutorial: Object-Oriented Programming for the Internet," Addison-Wesley, Oct. 20, 2000, http://journals.ecs.soton.ac.uk/java/tutorial/applet/overview/html.html.
Alta Vista, "Translations," Information Datasheet, Alta Vista Company, http://babelfish.altavista.com/translate.dyn, downloaded Sep. 4, 2000, p. 1.
"My Alta Vista: How to Use Babel Fish—What is Alta Vista Babel Fish?" Information Data.Sheet, Alta Vista Company, http://live.altavista.com/s?spage=help/bf _what.htm, downloaded on Sep. 4, 2000, pp. 1-2.
Anonymizer.com, Online Privacy Services, Information Datasheet, http://www.anonymizer.com/, downloaded Sep. 26, 2000, p. 1.
Anonymizer.com, Online Privacy Services, Information Datasheet, http://www.anonymizer.com/services/index.shtrnl, downloaded Sep. 26, 2000, pp. 1-4.
Barrett, R. et al. "How to Personalize the Web", CHI 97, ACM, Mar. 22-27, 1997, pp. 75-82.
Barrett, R. et al., "Intermediaries: An approach to manipulating information streams", IBM, 1999, IBM Systems Journal, vol. 38, No. 4, pp. 629-641.
Barrett, R. et al., "Intermediaries: New Places for Producing and Manipulating Web Content" Computer Networks and ISDN Systems 30, Apr. 1998, pp. 509-518.
Brendan, E. et al., Netscape Navigator, Netscape Navigation Corporation, 1996, • Mountain View, CA, pp. 24, 210.
Campione et al., "The Java Tutorial: Object-Oriented Programming for the Internet", Addison-Wesley, 1997, <http://iournals.ecs.soton.ac.uk/iava/tutorial/applet/overview/html.html> , 3 pages.
Co-pending U.S. Appl. No. 09/706,182, filed Nov. 3, 2000, entitled "Method and System for Modifying Requests for Remote Resources," Theron Tock et al., 58 page specification, 19 sheets of drawings.
Co-pending U.S. Appl. No. 09/706,181, filed Nov. 3, 2000, entitled "Method and System for Requesting and Providing Content From Server to Client Via an Intermediary Server," Theron Tock et al., 53 page specification, 19 sheets of drawings.
Co-pending U.S. Appl. No. 10/060,792, filed Jan. 29, 2002, entitled "Method and System for Providing Secure Access to Private Networks," TheronTock et al., 60 page specification, 23 sheets of drawings.
Co-pending U.S. Appl. No. 10/456,354, filed Jun. 5, 2003, entitled Method and System for Providing Secure Access to Private Networks, n Theron Tock et al., 33 page specification, 7 sheets of drawings.
Co-pending U.S. Appl. No. 10/060,525, filed Jan. 29, 2002, entitled "Method and System for Providing Secure Remote Access to Email Resources on Private Networks," Theron Tock et al., 51 page specification, 22 sheets of drawings.
Co-pending U.S. Appl. No. 10/410,619, filed Apr. 8, 2003, entitled "Method and System for Providing Secure Access to Private Networks With Client Redirection," Christopher Thomas et al., 72 page specification, 33 sheets of drawings.
Co-pending U.S. Appl. No. 09/706,296, filed Nov. 3, 2000, entitled uDynamic Toolbar for Markup Language Document, Sampath Srinivas et al., 50 page specification, 19 sheets of drawings.
Co-pending U.S. Appl. No. 09/706,297, filed Nov. 3, 2000, entitled "Method and System for Modifying Script Portions of Requests for Remote Resources," Theron Tock et al., 49 page specification, 19 sheets of drawings.
Desktop.com, "Welcome to Desktop.com!" Information Datasheet, http://www.desktop.com/, downloaded Sep. 26, 2000, p. 1.
Desktop.com, "Desktop.com Solutions," Information Datasheet, http://www.desktop.com/app/home/show/solutions/solutions.html, downloaded Sep. 26, 2000, pp. 1-2.
Desktop.com, "Company-About Us," Information Datasheet, http://www.desktop.com/static/home/company.html, downloaded Sep. 4, 2000, p. 1.
Desktop.com, "Company-Products," Information Datasheet, http://www.desktop.com/static/home/products.html, downloaded Sep. 4, 2000, pp. 1-2.
European Examination Report, European Application No. 03741889.4, Jan. 13, 2015, 4 pages.
Google, How to Google, "Why use Google?," Information Datasheet, Google Inc., http://www.google.com/why_use.html, downloaded Sep. 4, 2000, pp. 1-3.
Google, Business Development, "Google's advanced search Features," Information Datasheet, Google Inc., http://www.google.com/adv _features.html, downloaded Sep. 4, 2000, pp. 1-2.
Hunt, R., "Internet/Intranet Firewall Security—Policy, Architecture and Transaction Services," Computer Communications, Butterworths and Co. Publishers Ltd., GB, vol. 21, No. 13, Sep. 1, 1998, pp. 1107-1123.
The Microsoft Computer Dictionary. 5m ed. Redmond, WA: Microsoft Press. May 1, 2002, p. 474.
NetMind, "Products: Free Mind-it Service," Information Datasheet, Netmind, http://www.netmind.com/html/free _mind-it_ service.html, downloaded Jul. 4, 2000, pp. 1-2.
NetMind, "Products: Tracking," Information Datasheet, Netmind, http://www.netmind.com/html/products _tracking.html, downloaded Jul. 4, 2000, pp. 1-2.
NetMind, "Company: Technology," Information Datasheet, Netmind, http://www.netmind.com/html/technology.html, downloaded Jul. 4, 2000, pp. 1-2.
Netmind, "Webmaster: Your Web Site Essentials," Information Datasheet, Netmind, http://www.netmind.com/html/webmasters.html, downloaded Sep. 4, 2000, pp. 1-2.
PCT International Search Report and Written Opinion, PCT Application No. PCT/US03/17934, 3 pages, Nov. 13, 2003.
PCT International Preliminary Examination Report, PCT Application No. PCT/US03/17934, Jun. 21, 2004, 3 pages.
PCT International Search Report, PCT Application No. PCT/US01/29726, Aug. 28, 2003, 4 pages.
PCT Annex to Form PCT/ISA/206, PCT Application No. PCT/US02/34712, Received Mar. 20, 2003, 3 pages.
"Plug-in" definition printed from Webopedia Computer Dictionary (www.webopedia.com), print date Aug. 9, 2004, 1 page.
Raggett, D.: HTML 3.2 Reference Specification. W3C Recommendation; Jan. 1997; http://www.w3.org/TR/REC-html32, 49 pages.
Sun Microsystems: The Applet Tag; http://java.sun.com/j2se/1.4.2/docs/suide/misc/applet.html, 3 pages.
Third Voice, "Meet your Web Assistant," Information Datasheet, thirdvoice, inc., http://www.thirdvoice.com/whatIs/index.htm, downloaded Sep. 26, 2000, pp. 1-3.
Third Voice, Service Information, thirdvoice, Inc., http://www.thirdvoice.com/, downloaded Sep. 4, 2000, pp. 1-3.
Thompson et al., "Intermediary Architecture: Interposing Middleware Object Services between Web Client and Server" ACM, 1999, ACM Computing Surveys, vol. 31, Issue 2es, article No. 14.
United States Office Action, U.S. Appl. No. 10/456,354, Mar. 3, 2009, 15 pages.
United States Advisory Action, U.S. Appl. No. 10/456,354, Dec. 4, 2008, 3 pages.
United States Office Action, U.S. Appl. No. 10/456,354, Aug. 19, 2008, 20 pages.

(56) References Cited

OTHER PUBLICATIONS

United States Office Action, U.S. Appl. No. 10/456,354, Jun. 9, 2008, 9 pages.
United States Office Action, U.S. Appl. No. 10/456,354, Feb. 21, 2008, 10 pages.
United States Office Action, U.S. Appl. No. 10/456,354, Aug. 23, 2007, 15 pages.
United States Office Action, U.S. Appl. No. 10/456,354, Mar. 8, 2007, 13 pages.
Yahoo! Companion, "What is the Stock Market Toobar?," Information Datasheet, Yahoo! Inc, http://docs.companion.yahoo.com/companion/learnmore _ scompanion.html, downloaded Nov. 13, 2000, pp. 1-6.
Yahoo! Companion, "What is Yahoo! Companion?," Information Datasheet, Yahoo! Inc., http://docs.companion.yahoo.com/companion/leammore_companion.html, downloaded Nov. 3, 2000, pp. 1-4.
Yahoo! Companion, "Yahoo! Content and features on your browser!," Information Datasheet, Yahoo! Inc., http://edit.yahoo./com/config/download_companion, downloaded Nov. 3, 2000, p. 1.

* cited by examiner

METHOD AND SYSTEM FOR PROVIDING SECURE ACCESS TO PRIVATE NETWORKS

CROSS-REFERENCE TO RELATED APPLICATIONS

This application is a divisional of U.S. patent application Ser. No. 10/456,354, filed Jun. 5, 2003, which claims benefit to U.S. Provisional Application No. 60/387,146, filed Jun. 6, 2002, and entitled "METHOD AND SYSTEM FOR PROVIDING SECURE ACCESS TO PRIVATE NETWORKS," the entire contents of which are incorporated herein by reference.

This application is also related to (i) U.S. application Ser. No. 09/706,181, filed Nov. 3, 2000, and entitled "METHOD AND SYSTEM FOR REQUESTING AND PROVIDING CONTENT FROM SERVER TO CLIENT VIA AN INTERMEDIARY SERVER," which is hereby incorporated herein by reference, and (ii) U.S. patent application Ser. No. 10/060,792, filed Jan. 29, 2002, and entitled "METHOD AND SYSTEM FOR PROVIDING REMOTE SECURE ACCESS TO PRIVATE NETWORKS," which is hereby incorporated herein by reference.

BACKGROUND OF THE INVENTION

1. Field of the Invention

The present invention relates to client-server computing and, more particularly, to client-server computing for securely accessing resources over a network.

2. Description of the Related Art

Network browsers (browser applications), such as Netscape Navigator or Microsoft Explorer, allow users of client machines to request and retrieve resources from remotely located server machines via the Internet. These network browsers can display or render HyperText Markup Language (HTML) documents provided by the remotely located server machines. Additionally, browsers are able to execute script programs embedded in the HTML documents to provide some local functionality.

Further, applets (e.g., Java™ applets) can also be embedded in the HTML documents. In such case, the browser will fetch the bytecode for the applet from a web server by issuing HTTPS requests to get the appropriate class and/or archive files for the applet. The received bytecode is then loaded into a virtual machine (e.g., Java Virtual Machine). During runtime, the applet typically communicates with an application server over a secure connection, such as HTTPS or socket connections. Further, in the case of Java, the Java Sandbox operates to restrict the applet from communicating with a network domain (host) other than the network domain from which the applet was obtained.

Conventionally, network browsers are used to access public networks, such as the Internet. Private networks are normally protected by firewalls so that network browsers residing on computing machines outside the private network are not able to gain access to any resources on the private network.

While firewalls are effective at protecting against external access to private networks, there is often the need for external persons or businesses to gain at least limited access to the private networks of other persons or businesses. For example, a supplier of parts to a business customer may be able to better serve their business customer by having access to information (e.g., inventory levels or orders) maintained on the private network of the business customer. One conventional approach is to allow the supplier's machine to access the private network through the firewall via a public network. This provides a "hole" in the firewall that seriously compromises the security of the private network. Hence, this conventional approach is normally not permitted if security is an important concern. Another conventional approach is to establish a Virtual Private Network (VPN) with the supplier's machine. Here, the supplier's machine is also able to access the private network through the public network and the firewall, but all data transmissions are encrypted. Some firewalls support VPNs and protocols providing encrypted communications, such as Point-to-Point Tunneling Protocol (PPTP). While VPNs offer remote secure access, they are difficult to arrange, configure and manage. Each VPN must also be provided for each external person or business given access to the private network. Still further, VPNs are costly and each VPN provides some security exposure to the entire private network.

Thus, there is a need for improved approaches to providing secure remote access to resources maintained on private networks.

SUMMARY OF THE INVENTION

Broadly speaking, the invention pertains to improved approaches for providing secure remote access to resources maintained on private networks.

According to one aspect of the invention, predetermined elements, such as applets, can be modified to redirect all communications to and from an application server through an intermediate server. The intermediate server in turn communicates with the application servers. Often the applications are secured by a firewall, but the intermediate server is trusted enough to gain access to the application servers, thereby indirectly allowing the applets to communicate with the application servers via the intermediate server.

According to another aspect of the invention, a communication framework can be provided to funnel communication between an applet and a server through a communication layer so as to provide managed and/or secured communications there between.

The invention can be implemented in numerous ways, including as a system, method, device, and a computer readable medium. Several embodiments of the invention are discussed below.

As a method for modifying a markup language page to redirect resource requests to an intermediate server, one embodiment of the invention includes at least the acts of: identifying, within the markup language page, a predetermined element that includes at least a first network address; and modifying the first network address within the predetermined element of the markup language page to a second network address that pertains to the intermediate server.

As a method for processing resource requests provided to an intermediate server from a client via a computer network, one embodiment of the invention includes at least the acts of: receiving a resource request for a particular resource, the resource request being provided to the intermediate server from the client via the computer network; extracting a destination server from the resource request; requesting the particular resource from the destination server; receiving the particular resource from the destination server; modifying the particular resource to redirect internal resource requests to the intermediate server; sending the modified particular resource to the client; receiving an applet code request for an applet identified within the modified particular resource; requesting applet code for the applet from a remote server via the computer network; receiving the applet code from the remote server in response to the requesting of the applet code; modifying the applet code to redirect its external communications through the intermediate server; and sending the modified applet code to the client.

As a system for communicating between a client and a server, one embodiment of the invention includes at least: a communication layer at a client, the communication layer transforming one or more socket connections into a pair of unidirectional secure URL connections; an applet operating at the client to perform operations and to create at least one socket connection with the communication layer; and a server operatively connected with the pair of unidirectional secure URL connections, the server communicating with the applet via the pair of unidirectional secure URL connections provided by the communication layer.

As a system for communicating between a client and a server, one embodiment of the invention includes at least: a plurality of browser applications, at least a plurality of the browser applications utilizing at least one operating applet and a communication layer, the applet operating to perform operations and to create at least one socket connection with the communication layer, and the communication layer for each of the browsers operates to transform the socket connections into a pair of unidirectional URL connections; and a server operatively connected with the pair of unidirectional URL connections associated with the communication layer associated with each of the plurality of browser applications, the server communicating with the at least one operating applet of the plurality of browser applications via the pair of unidirectional URL connections provided by the communication layer corresponding thereto.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

According to one aspect of the invention, applets are modified to redirect all communications to and from an application server through an intermediate server. The intermediate server in turn communicates with the application servers. Often the applications are secured by a firewall, but the intermediate server is trusted enough to gain access to the application servers, thereby indirectly allowing the applets to communicate with the application servers via the intermediate server.

Figure 1:
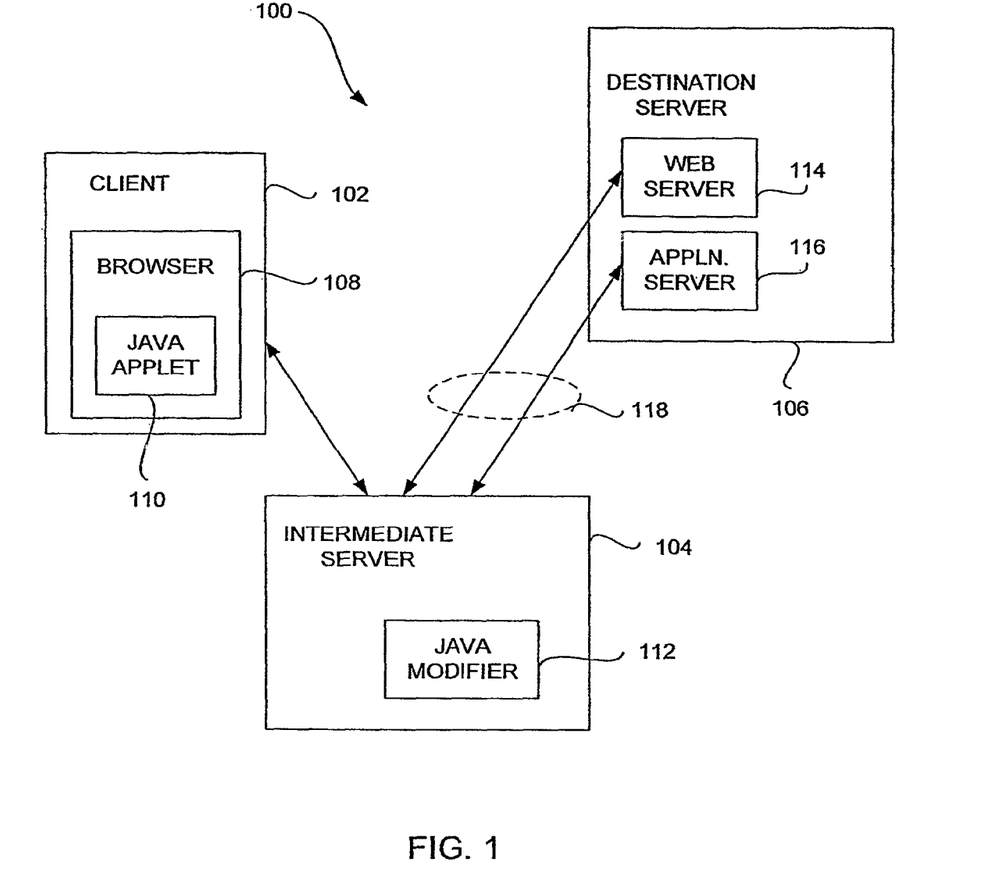
FIG. 1 is a block diagram of a computing environment according to one embodiment of the invention.

FIG. 1 is a block diagram of a computing environment 100 according to one embodiment of the invention. The computing environment 100 includes a client 102, an intermediate server 104, and a destination server 106. The client 102 pertains to a computing device, such as a personal computer, desktop computer or Personal Digital Assistant (PDA) for example. A browser 108 is a program that operates on the client 102 to send, receive and display resources residing on remote servers. A Java applet 110 is another application that is operated within the browser 108.

The intermediate server 104 includes a Java modifier 112 that operates to modify a Java applet before supplying the Java applet to the client 102. The modified Java applet, once provided to the client 102, becomes the Java applet 110. The destination server 106 includes a web server 114 and an application server 116. The intermediate server 104 couples to the client 102 through a first network (not shown), and the intermediate server 104 couples to the destination server 106 through the first network or a second network (not shown). The first and second networks can include wired and wireless components, and can comprise the Internet, Local Area Networks, Wide Area Networks, etc. Typically, although not necessarily, the coupling of the intermediate server 104 to the destination server 106 is achieved through a firewall 118. The firewall 118 serves to restrict the ability for external computing devices to gain access to the destination server 106.

The general operation of the computing environment 100 can be as follows. Typically, a user would interact with the browser 108 operating at the client 102. Such interaction would cause the browser 108 to request a web resource (e.g., HTML page) from the destination server 106. However, the web resource request would be intercepted by the intermediate server 104. The intermediate server 104 would then produce a reformatted web resource request from the web resource request received from the browser 108. Thereafter, the reformatted web resource request would be sent (e.g., over the second network) to the destination server 106 (e.g., the web server 114). The destination server 106 would then retrieve the requested web resource and return it to the intermediate server 104. At this point, the intermediate server 104 can operate to modify the web resource to facilitate redirection of subsequent resource requests internal to the web resource to the intermediate server 104. In other words, the web resource is modified such that any subsequent requests from the requested web resource are directed initially to the intermediate server 104 (as opposed to an appropriate destination server). In particular, a Java modifier 112 at the intermediate server 104 can modify links or attribute values within the web resource. Among other things, the attributes or values being modified within the web resource can include those attributes or values found within Java elements contained within the web resource. The modified web resource is then sent from the intermediate server 104 to the browser 108 via the client 102. Then, when the modified web resource is evaluated (e.g., displayed) by the browser 108, the modified web resource includes the Java applet 110. At this point, the browser 108 will send to the intermediate server 104 a request for the code (i.e., bytecode) for the Java applet 110 to the intermediate server 104. Upon receiving the request for the code for the Java applet, the intermediate server 104 reformats the request. The reformatted request is then sent to the appropriate destination server 106. At the destination server 106, the request code is retrieved and sent to the intermediate server 104. The retrieved code is then modified by the Java modifier 112. Here, the retrieved code (for the Java applet 110) is modified such that communications between the client 102 and the destination server 106 are redirected to the intermediate server 104 in a secure fashion. Despite the redirection, the code for the Java applet 110 is able to communicate with the destination server 106 through the intermediate server 104, even though the code for the Java applet 110 was originally designed to directly communicate with the destination server 106.

Although FIG. 1 illustrates only a single destination server and a single client, it should be understood that an intermediate server can support many clients and can facilitate access to many destination servers.

Figure 2:
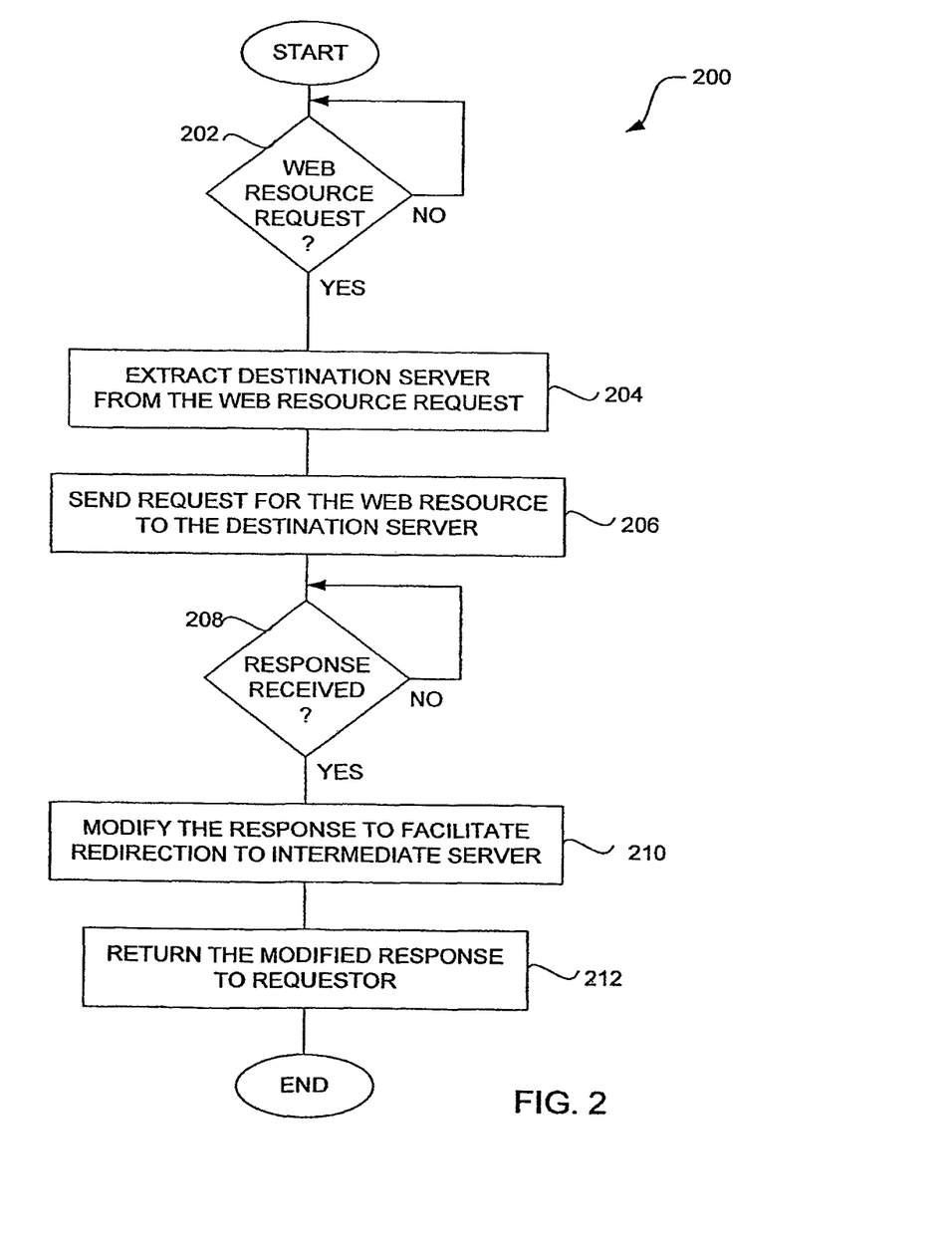
FIG. 2 is a flow diagram of web resource request processing according to one embodiment of the invention.

FIG. 2 is a flow diagram of web resource request processing 200 according to one embodiment of the invention. The web resource request processing 200 is, for example, performed at an intermediate server, such as the intermediate server 104 illustrated in FIG. 1, for example.

The web resource request processing 200 begins with a decision 202 that determines whether a web resource request has been received. Here, the web resource request processing 200 awaits the receipt of a web resource request from the client. Hence, when the decision 202 determines that a web resource request has not been received, then the web resource request processing 200 awaits such a request. Once the decision 202 determines that a web resource request has been received, a destination server is extracted 204 from the web resource request. Here, the web resource request is originally destined for the intermediate server because such a redirection has been imposed. However, the actual destination server for the web resource request is contained within the web resource request. Hence, the actual destination server can be obtained (extracted 204) from the web resource request being received at the intermediate server from the client.

After the destination server has been extracted 204 from the web resource request, a replacement request for the web resource can be sent 206 to the destination server. Here, the intermediate server can reformat the original web resource request or otherwise generate the replacement request.

Next, a decision 208 determines whether a response to the replacement request has been received from the destination server. When the decision 208 determines that a response has not yet been received, then the web resource request processing 200 awaits such a response. Once the decision 208 determines that a response has been received from the destination server, the response is modified 210 to facilitate redirection to the intermediate server. According to one embodiment, the modification to the response involves altering complete or partial Universal Resource Locators (URLs) within the response, altering attribute values, or inserting additional elements. After the response has been modified 210, the modified response is returned 212 to the requestor. In one embodiment, the requestor is a browser operating on the client. In another embodiment, the requester is the client or the user of the browser or client. Following the operation 212, the web resource request processing 200 is complete and ends.

Once the modified response is received at the client, the browser at the client typically displays the modified response. In addition, when the modified response includes internal resource requests, such as for images and applets, the browser makes subsequent requests for such additional resources. The processing of a subsequent request for an applet is described below with respect to FIG. 3.

Figure 3:
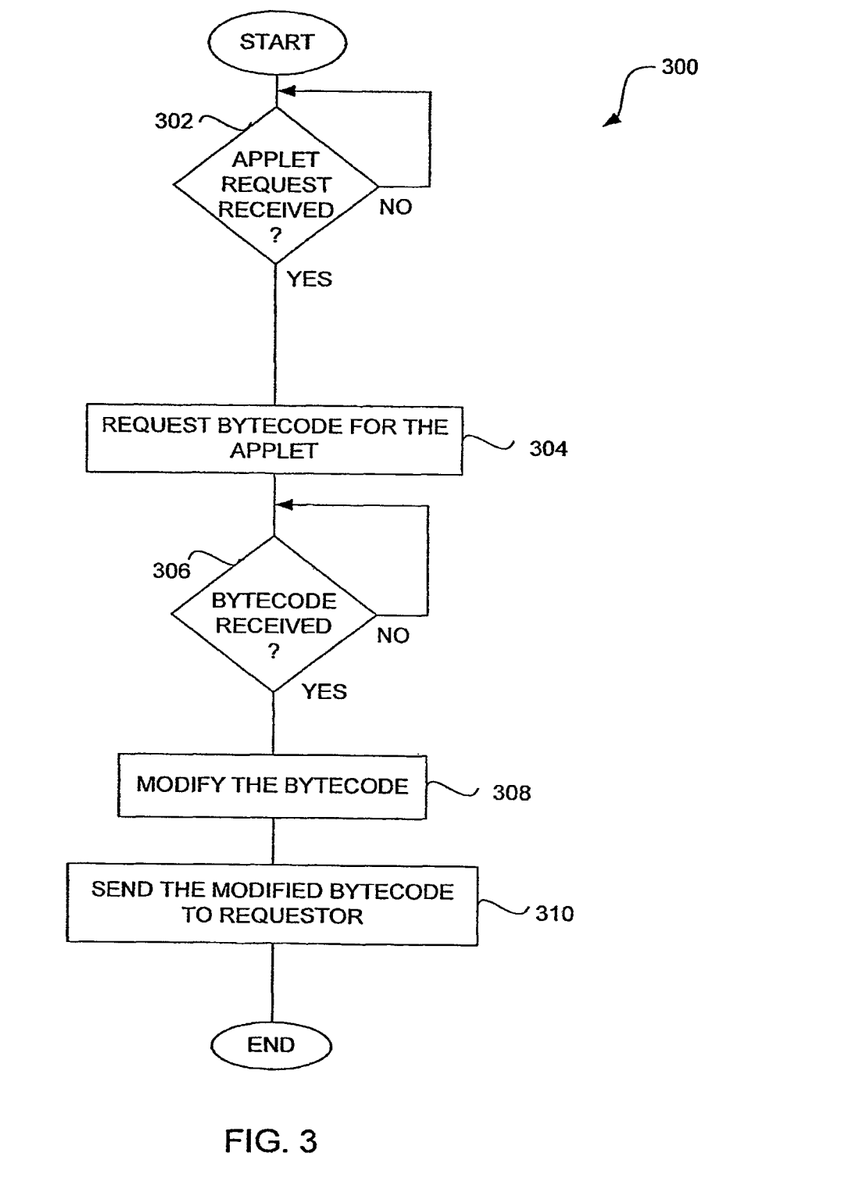
FIG. 3 is a flow diagram of applet request processing according to one embodiment of the invention.

FIG. 3 is a flow diagram of applet request processing 300 according to one embodiment of the invention. The applet request processing 300 is, for example, performed at an intermediate server, such as the intermediate server 104 illustrated in FIG. 1, for example.

The applet request processing 300 begins with a decision 302 that determines whether an applet request has been received. When the decision 302 determines that an applet request has not yet been received, the applet request processing 300 awaits such a request. Once the decision 302 determines that an applet request has been received, then bytecode for the applet is requested 304. Typically, the bytecode for the applet will reside on the same destination server from which the web resource (including the java applet) was obtained. Hence, the bytecode for the applet will be requested 304 from the destination server.

Next, a decision 306 determines whether the bytecode has been received from the destination server. When the decision 306 determines that the bytecode has not yet been received at the intermediate server, then the applet request processing 300 awaits its arrival. Once the decision 306 determines that the bytecode has been received, then the bytecode is modified 308. The modifications made to the bytecode facilitate redirection of communications between the client and the destination server through the intermediate server. After the bytecode has been modified 308, the modified bytecode is sent to the requestor. In one embodiment, the requestor is a browser operating on the client. In another embodiment, the requester is the client or the user of the browser or client. Following the operation 310, the applet request processing 300 is complete and ends.

Figure 4:
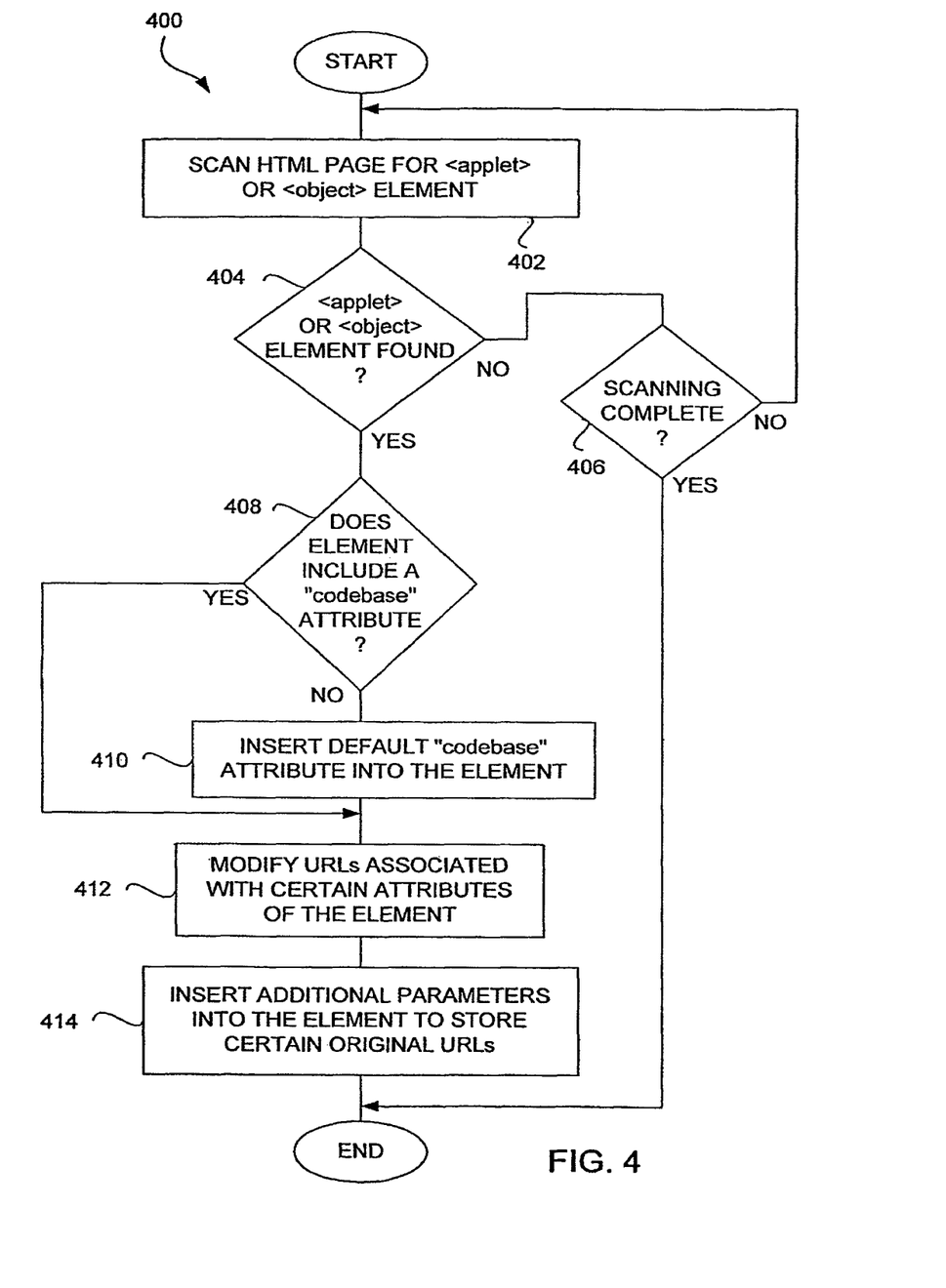
FIG. 4 is a flow diagram of response modification processing according to one embodiment of the invention.

FIG. 4 is a flow diagram of response modification processing 400 according to one embodiment of the invention. The response modification processing 400 is, for example, processing performed by the operation 210 illustrated in FIG. 2. In FIG. 4, the response being modified is assumed to be an HTML page. However, it should be understood that the response being modified could be some other sort of web resource, including any markup language document.

The response modification processing 400 initially scans 402 an HTML page for <applet> or <object> elements. Here, the <object> being scanned for is typically a Java object. The <applet> or <object> elements specify embedded Java applets within the HTML page. A decision 404 then determines whether an <applet> or <object> element has been found. When the decision 404 determines that such objects have not been found during the scanning 402 of the HTML page, then a decision 406 determines whether scanning has been completed. When the decision 406 determines that scanning has not been completed, then the modify response processing 400 returns to repeat the operation 402 and subsequent operations. Alternatively, when the decision 406 determines that scanning has been completed, the response modification processing 400 is complete and ends.

On the other hand, when the decision 404 determines that either <applet> or <object> elements have been found, then a decision 408 determines whether the element includes a "codebase" attribute. When the decision 408 determines that the element does not include a "codebase" attribute, then a default "codebase" attribute is inserted 410 into the element. Alternatively, when the element does include a "codebase" attribute, the operation 410 is bypassed.

Subsequently, URLs associated with certain attributes of the element are modified 412. Here, the URLs being modified 412 can include complete or partial URLs. For example, the attributes of the element being modified can include a "codebase" attribute as well as various parameters. Further, additional parameters can also be inserted 414 into the element. In particular, additional parameters can be inserted into the element to store original URLs of the document and the codebase. Following the operation 414, the response modification processing 400 is complete and ends with the response having been modified.

According to one implementation, the operations 412 and 414 of the applet request processing 400 are as follows. Assume that the network address (e.g., URL) for the intermediate server is "http://www.danastreet.com." One of the URLs being modified is a codebase attribute that identified the location of the bytecode for the applet. The codebase attribute is either an absolute (complete) URL or a relative (partial) URL. In one implementation, if the codebase specifies an absolute URL, it is translated to a URL pointing to the intermediate server, with the original host and path information embedded.

For example, an original URL of "http://xyz.com:123/abc" could be translated to https://www.danastreet.com/abc/DanaInfo=xyz.com,Port=123,CTjava" where "DanaInfo" identifies the original host, "Port" identifies the original port, and "CT" indicates the content type (e.g., Java applet). Alternatively, if the codebase specifies only a relative URL (which uses the base of the HTML page), e.g., "abc/xyz", the intermediate server will first construct the absolute URL by using the URL of the HTML page (or specified in a <base> tag) and then will transform the resulting URL using the above approach. Note that when the default "codebase" attribute is to be inserted 410, the "DanaInfo" is able to be preserved, and thus not lost when files from the same directory are fetched. Another of the URLs within <applet>...</applet> tags being modified are the parameters for "codebase value" and "cabbase value." More particularly, the value specified for <param name=codebase value= ... > will be transformed using the above approach. The value specified for <param name=cabbase value= ... > will be transformed using the above approach if it is an absolute URL. In addition, two new applet parameters "neoteris-doc-base" and "neoteris-code-base" are injected before </applet> to store the values of the original document URL and the original codebase URL as they were prior to the above transformations.

A representative example of this implementation of the operations 412 and 414 of the applet request processing 400 are as follows. Assume that an HTML page at URL "http://www.acmegizmo.com/myapplet.html" contains an applet:

```
<applet codebase="myapplet/classes" archive="applet.jar">
<param name=cabbase value="applet.cab">
</applet>
```

According to the representative example, the applet will be rewritten (transformed) to:

```
<applet
codebase="myapplet/classes,DanaInfo=www.acmegizmo.com,CT=java+" archive="applet.jar">
<param name=cabbase value="applet.cab">
<param name=neoteris-code-base
value=http://www.acraegizmo.com/myapplet/classes>
<param name=neoteris-doc-base
value=http://www.acmegizmo/myapplet.html>
</applet>
```

Figure 5:
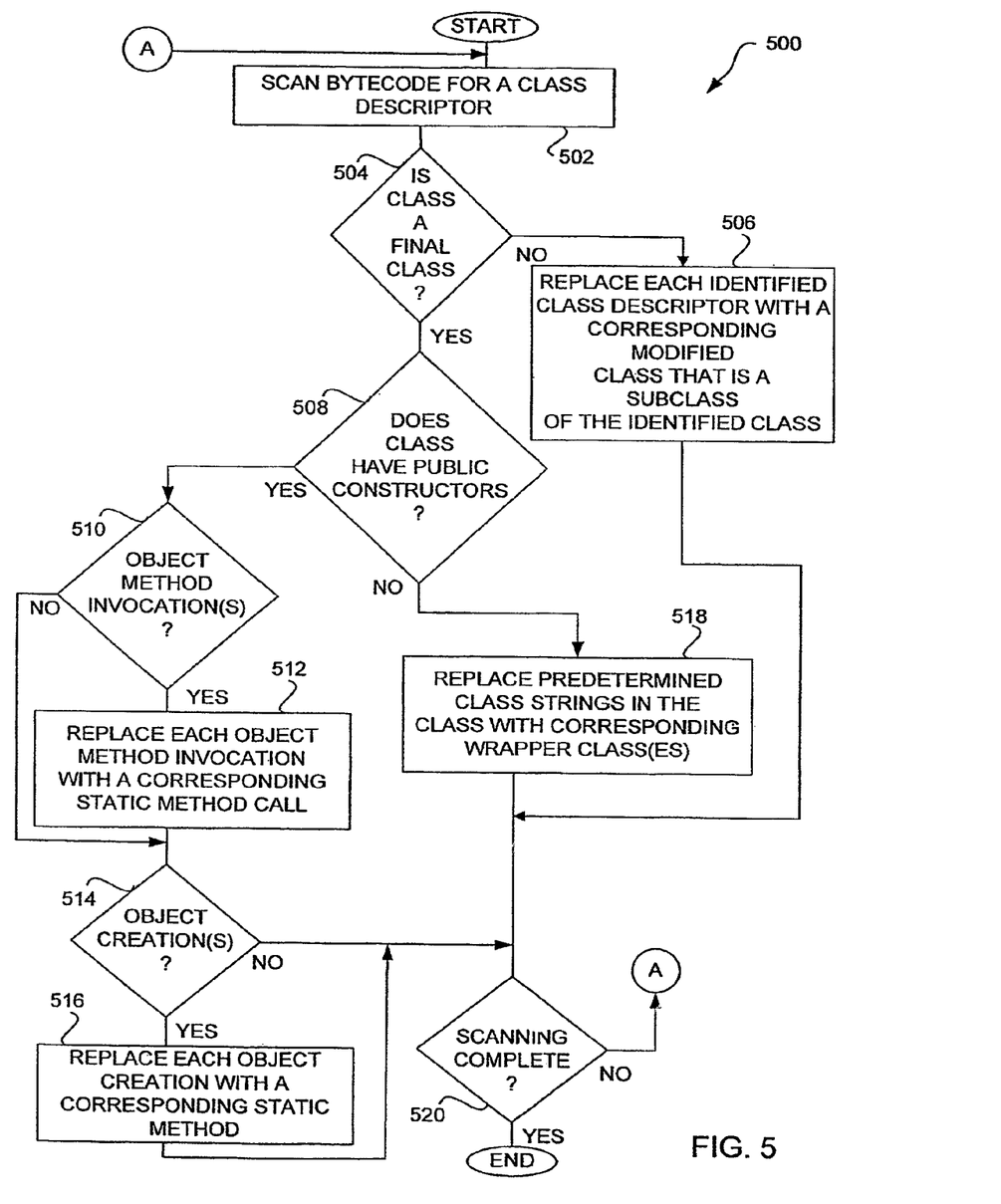
FIG. 5 is a flow diagram of bytecode modification processing according to one embodiment of the invention.

FIG. 5 is a flow diagram of bytecode modification processing 500 according to one embodiment of the invention. The bytecode modification processing 500 is, for example, performed by a java modifier, such as the java modifier 112 illustrated in FIG. 1. In addition, the bytecode modification processing 500 is, for example, suitable for use as the processing performed by the operation 308 illustrated in FIG. 3.

By modification of the bytecode, the behavior of an applet is modified such that all HTTP and socket based network communications are redirected to an intermediate server over HTTPS connections. The intermediate server manages connection end points with actual application servers and forwards network traffic between Java applets and application servers.

The bytecode modification processing 500 initially scans 502 bytecode of the Java applet for a class descriptor. Once a class descriptor has been identified in the bytecode, a decision 504 determines whether the class is a final class. When the decision 504 determines that the class is not a final class, then each identified class descriptor is replaced 506 with a corresponding modified class that is a subclass of the identified class.

Alternatively, when the decision 504 determines that the class is a final class, then a decision 508 determines whether the class has public constructors. When the decision 508 determines that the class does have public constructors, then a decision 510 determines whether object method invocations are present. When the decision 510 determines that object method invocations are present, then each object method invocation is replaced 512 with a corresponding static method call. Following the operation 512, as well as directly following the decision 510 when no object method invocations are present, a decision 514 determines whether object creations are present. When the decision 514 determines that object creations are present, then each object creation is replaced 516 with a corresponding static method. On the other hand, when the decision 508 determines that the class does not have public constructors, then predetermined class strings in the class are replaced 518 with corresponding wrapper classes.

Following the operations 506, 516 and 518, as well as directly following the decision 514 when object creations are not present, a decision 520 determines whether scanning of the HTML page has been completed. When the decision 520 determines that scanning has not been completed, then the bytecode modification processing 500 returns to repeat the operation 502 and subsequent operations. Alternatively, when the decision 520 determines that scanning has been completed, the bytecode modification processing 500 is complete and ends.

Bytecode files for a Java applet are normally stored at an application server within a destination server. The bytecode files are either stored individually (e.g., class files), or bundled into archive files. The archive files can be in the format of .zip files, .jar files, or .cab files, each using a different compression method and specification. Upon fetching the bytecode files, and uncompressing the archive files if necessary, an intermediate server applies one or more of the following four techniques in modifying each individual bytecode class file. These techniques and examples provided below are described at the Java language level; however, these modification are preferably performed at the bytecode level.

According to one implementation of a first technique, the operation 506 of the bytecode modification processing 500 is as follows. According to the first technique, when an original class is not final, a new subclass is created and then all objects of the original class are replaced with the new class. For example, whenever a "java.applet.Applet" class is encountered, it is replaced with a "com.neoteris.NeoterisApplet" class, which is a subclass of "java.applet.Applet". Since all applets contain subclasses of "java.applet.Applet", this essentially makes them all subclasses of "com.neoteris.NeoterisApplet".

A representative Java language level example of this implementation of the first technique is as follows. An initial applet, MyApplet, initially includes

```
import java.applet.*;
public MyApplet extends Applet {
...
}
``` and is effectively modified as shown below to become a subclass of NeoterisApplet.

```
import com.neoteris.NeoterisApplet;
public MyApplet extends NeoterisApplet {
...
}
```

NeoterisApplet modifies the methods of the applet to reverse the effect of rewriting of codebase so that the inquiring of applet information (e.g., codebase) from within the applet's application logic will yield the same result as if there had been no modification to the bytecode.

The implementation of the first technique further modifies socket interfaces in the bytecode so that socket connections are transformed into HTTPS connections. For example, whenever a "java.net.Socket" class is encountered, it is replaced with "com.neoteris.NeoterisSocket" or subclasses of it. A representative Java language level example of this implementation of the first technique for socket connections is as follows. Assume that the applet originally contained,

```
import java.net.Socket;
import java.io.*;
Socket sock = new Socket ("myserver.com", 1234);
InputStream is = sock.getInputStream( );
...
``` and then is effectively modified as shown below to alter the nature of the socket connections.

```
import com.neoteris.NeoterisSocket;
import java.io.*;
Socket sock = new NeoterisSocket("myserver.com", 1234);
// will return a NeoterisInputStream object
InputStream is = sock.getInputStream( );
...
```

The implementation of the first technique still further modifies socket interfaces in the bytecode so that datagram sockets are similarly modified. For example, whenever a "java.net.DatagramSocket" class is encountered, it is replaced with "com.neoteris.NeoterisDatagramSocket" or subclasses of it.

According to one implementation of a second technique, the operation 512 of the bytecode modification processing 500 is as follows. According to the second technique, object method invocations with the original class are changed to static methods (calls to static methods) so that communications with the intermediate server operate properly. For example, whenever the following method invocations on "java.net.URL" are encountered, they are replaced with the corresponding static methods of class "com.neoteris.NeoterisStatic" (with the same name). These methods are, for example: getHost, getPort, getFile, getProtocol, openStream and openConnection. Further, other methods, namely, java.net.Socket: getInetaddress and java.net.DatagramSocket: getAddress and setAddress, are also transformed to static methods in NeoterisStatic (with the same name), the return values being NeoterisInetAddress.

According to one implementation of a third technique, the operation 516 of the bytecode modification processing 500 is as follows. According to the third technique, creation of an object class is replaced with a static method. Because of the inability to subclass a Java class that is declared final, it is necessary to replace the bytecode instruction that creates an object with static methods in order to inject additional code to process parameters. For example, the creation of an object of class java.net.URL is replaced with the static method translateURL of class com.neoteris.NeoterisStatic. As another example, the creation of an object of class java.net.DatagramPacket is replaced with the static method translateDatagramPacket of class com.neoteris.NeoterisStatic.

A representative Java language level example of this implementation of the second and third techniques for inserting static methods is as follows. Assume that the applet originally contained,

```
URL url = new URL("http", "myserver.com", 80,
    "cgi/dothis?task=1");
String host = url.getHost( );
``` and then is effectively modified as shown below to inject the static methods.

```
// Will become
// "http://www.danastreet.com/cgi/dothis?task=1,DanaInfo=
// myserver.com,Port=80,CT=txt"
URL url = NeoterisStatic.translateURL("http",
    "myserver.com", 80, "myapplet/dothis?task=1");
// Will reverse the effect of URL translation and return
// host string "myserver.com"
String host = NeoterisStatic.getHost(url);
```

According to one implementation of a fourth technique, the operation 518 of the bytecode modification processing 500 is as follows. According to the fourth technique, class strings are replaced with a specialized string. In cases where a standard Java class is a final class and has no public constructors, such as java.net.InetAddress, all occurrences of the class string, (in both class name and in method descriptors) are replaced with a specialized class that implements communications through an intermediate server. For example, for all occurrences of java.net.InetAddress, they are replaced with com.neoteris.NeoterisInetAddress. More particularly, this would include strings in the constant (const) pool of the bytecode that represent the class, i.e., "java/net/InetAddress", and any appearance of "java/net/InetAddress" in a descriptor, such as "(Ljava/net/InetAddress;String)V".

A representative Java language level example of this implementation of the second and fourth techniques for performing string replacements is as follows. Assume that the applet originally contained,

```
public class MyClass {
    public String getInfo(InetAddress addr, int type);
    ...
}
MyClass cl = new MyClass( );
Socket sock = new Socket(...);
cl.getInfo(sock.getInetAddress, 2);
``` and then is effectively modified to the following.

```
public class MyClass {
    public String getInfo(NeoterisInetAddress addr, int
type);
    ...
}
MyClass cl = new MyClass( );
Socket sock = new NeoterisSocket(...);
cl.getInfo(NeoterisStatic.getInetAddress(sock), 2);
```

According to one implementation of a fifth technique, although not shown in FIG. 5, somewhere in the scanning operation of the bytecode modification processing 500, static class methods of a Java class are replaced with static class methods of a specialized class (e.g., NeoterisStatic). A representative Java language level example of this implementation of the fifth technique for static class methods is as follows. Assume that the applet originally contained, JSObject object=JSobject.getWindow(this_applet);

and then is effectively modified as shown below

JSObject object=NeoterisStatic.getJSWindow(this_applet);

According to another aspect of the invention, a communication framework is provided to funnel communication between an applet and a server through a communication layer so as to provide managed and/or secured communications there between. In one embodiment, socket connections from one or more applets are funneled into HTTPS connections, namely, a pair of unidirectional HTTPS connections.

Figure 6:
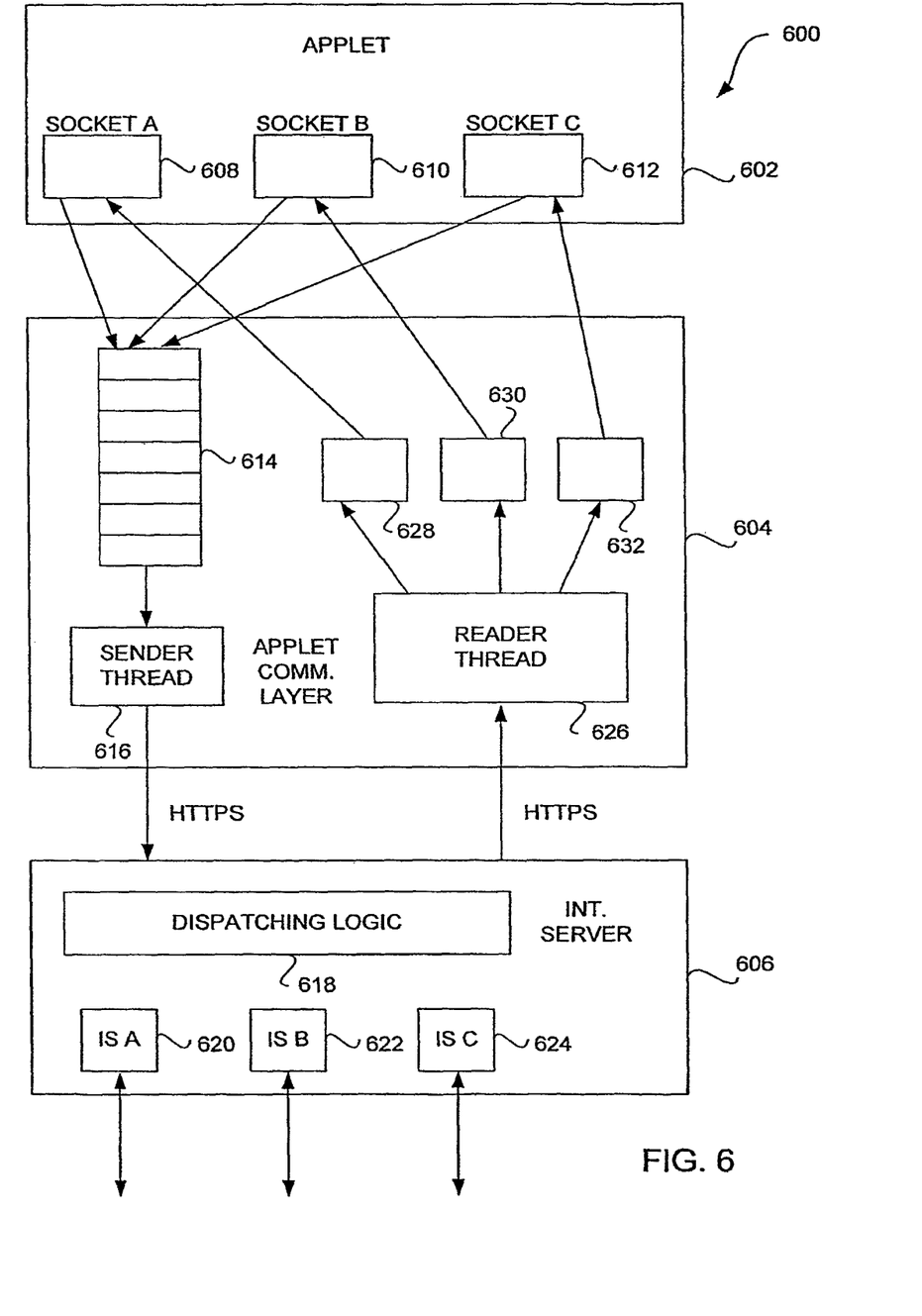
FIG. 6 is a block diagram of a communication framework according to one embodiment of the invention.

FIG. 6 is a block diagram of a communication framework 600 according to one embodiment of the invention. The communication framework 600 provides for communications between applets operating at a client with destination servers (or remote content servers). The communication framework 600 shown in FIG. 6 includes an applet 602, an applet communication layer 604 and an intermediate server 606. The general communications scheme is that the applet 602 sends outgoing communications through the applet communication layer 604 and then onto the intermediate server 606 before being delivered to an appropriate destination server. Typically, the communications would be delivered to an application server within the appropriate destination server. Also, communications incoming to the applet 602 are initially received at the intermediary server 606 (from the destination server or an application server thereof). The incoming communications are then directed by the intermediate server to the applet communication layer 604. The applet communication layer 604 then directs the incoming communications to the applet 602.

The applet 602 includes a plurality of communication sockets (socket connections), namely, socket A 608, socket B 610 and socket C 612. Each socket effectively provides a communication link, channel or connection to an eventual destination server. The sockets 608-612 provide communications in both incoming and outgoing directions. Normally, the communication is achieved through transmission of packets of data. The outgoing packets from the sockets 608-612 are supplied to an outgoing queue 614 of the applet communication layer 604. In other words, the outgoing queue 614 queues the packets being sent from the applet 602 to the applet communication layer 604. A sender thread 616 interacts with the outgoing queue 614 to send those packets residing in the outgoing queue 614 to the intermediate server 606. The communications between the sender thread 616 of the applet communication layer 604 and the intermediate server 606 are preferably achieved over a secure connection. One such secure connection is a HTTPS connection. Once the packets arrive at the intermediate server 606, dispatching logic 618 determines which of a plurality of intermediate sockets the packets should be directed to. As depicted in FIG. 6, the intermediate server 606 is shown including intermediate socket A 620, intermediate socket B 622 and intermediate socket C 624. Each of the intermediate sockets 620-624 couples to and provides a socket connection with a destination server (or application server therein), normally a different destination server for each of the intermediate sockets 620-624.

Incoming communications are directed from one of the destination servers to one of the intermediate sockets 620-624 of the intermediate server 606. Normally, the communication is achieved through transmission of packets of data. The communication of these packets from the intermediate server 606 to a reader thread 626 of the applet communication layer 604 is achieved over a secure connection, namely, a HTTPS connection. The reader thread 626 then determines which of a plurality of buffers the incoming packets should be directed to. Namely, the applet communication layer 604 includes buffers 628-632. Each of the buffers 628-632 corresponds to one of the sockets 608-612 within the applet 602. Hence, packets destined for the socket A 608 of the applet 602 are directed to the buffer 628 by the reader thread 626. Similarly, packets directed to the socket B 610 are directed to the buffer 630 by the reader thread 626, and packets destined for the socket C 612 are directed to the buffer 632 by the reader thread 626. When the sockets of the applet 602 read from the socket's input stream, it retrieves any packets for the socket that are in the corresponding buffer. Once a socket of the applet 602 is destroyed, the corresponding input and output stream objects, along with underlying data structures (e.g., buffers), are destroyed.

The connections between the applet communication layer 604 and the intermediary server 606 are provided by HTTPS. Namely, one HTTPS connection for outgoing packets, and another HTTPS connection for incoming packets. Each of these HTTPS connections is half-duplexed, meaning that it supports communications in one direction. Additionally, the outgoing HTTPS connection from the applet communication layer 604 is a transient connection. The transient connection is such that the sender thread 616 establishes the connection while packets are stored in the outgoing queue 614 and ready to be delivered. Once the sender thread 616 has sent all the available packets from the outgoing queue 614, the outgoing HTTPS connection is closed. On the other hand, the incoming HTTPS connection to the applet communication layer 604 (namely, the reader thread 626) is maintained as a persistent connection (at least until a time-out occurs). In other words, to timely deliver incoming packets to the appropriate sockets within the applet 602, the reader thread 626 constantly monitors the incoming HTTPS connection to discover incoming data packets.

By using the HTTPS connections between the applet communication layer 604 and the intermediate server 606, the communications there between are secured. Also, the applet communication layer 604 allows the pair of HTTPS connections to support numerous sockets (socket connections)

within the applet 602. Therefore, the limitation of Java applets that only a maximum of two (2) URL connections be permitted is able to be satisfied, yet the applet or applets are able to have many more active sockets than two.

Figure 7:
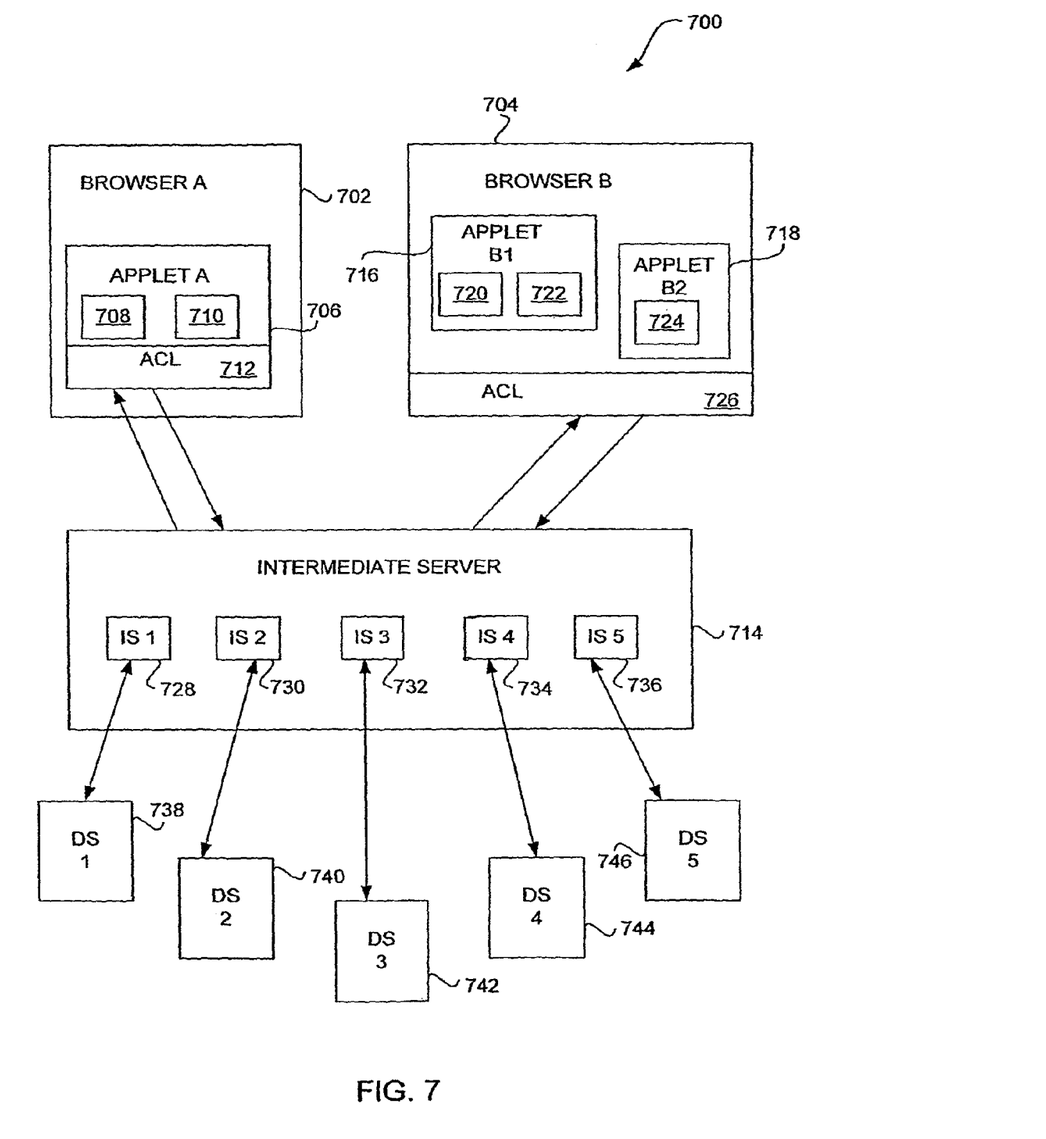
FIG. 7 is a block diagram of a communication framework according to another embodiment of the invention.

FIG. 7 is a block diagram of a communication framework 700 according to another embodiment of the invention. The communication framework 700 illustrates use of a plurality of browsers sharing an intermediate server and then coupling to various different destination servers through the shared intermediate server. Applets operating on these browsers are able to communicate over secure connections to the intermediate server which directs communications to and from the appropriate destination server (or application server therein).

The communication framework 700 illustrated in FIG. 7 includes a browser A 702 and a browser B 704. The browser A 702 includes an applet A 706. The applet A 706 has socket connections 708 and 710. These socket connections 708 and 710 communicate through an applet communication layer 712 with an intermediate server 714. In one embodiment, the applet communication layer 712 is designed as shown in FIG. 6. Typically, the applet communication layer 712 communicates with the intermediate server 714 over a pair of HTTPS connections. Each of the HTTPS connections provides secure communications in a single direction (i.e., unidirectional).

The browser B 704 includes an applet B1 716 and an applet B2 718. The applet B1 716 includes socket connections 720 and 722, and the applet B2 718 includes socket connection 724. The socket connections 720-724 communicate with the intermediate server 714 through an applet communication layer 726. Here, the applet communication layer 726 is able to support socket connections from one or more applets operating on the browser B 704. The applet communication layer 726 couples to the intermediate server 714 through a pair of HTTPS connections. Each of the HTTPS connections provide secure communications in a single direction (i.e., unidirectional).

The intermediate server 714 includes a plurality of intermediate socket connections. Namely, the intermediate server 714 includes intermediate socket connection-1 728, intermediate socket connection-2 730, intermediate socket connection-3 732, intermediate socket connection-4 734, and intermediate socket connection-5 736. The intermediate socket connection-1 728 provides a connection with a destination server-1 738. The intermediate socket connection-2 730 provides a connection with a destination server-2 740. The intermediate socket connection-3 732 provides a connection to a destination server-3 742. The intermediate socket connection-4 734 provides a connection to a destination server-4 744. The intermediate socket connection-5 736 provides a connection to a destination server-5 746.

Additionally, the socket connections 708, 710 and 720-724 in the applets 716 and 718 are associated with the intermediate socket connections 728-736 in the intermediate server 714. Namely, the applet A 706 forms the socket connection 708 to communicate with the destination server-1 738. However, the delivery of packets for communications between the socket connection 708 and the destinations server-1 738 is achieved through the applet communication layer 712 and the intermediate server 714. In particular, the socket connection 708 sends packets to the applet communication layer 712 that forwards the packets over the HTTPS connection to the intermediate server 714. The intermediate server 714 recognizes that the incoming packets originated from the socket connection 708 of the applet A 706 and thus directs the packets to the intermediate socket connection-1 728. The intermediate server 714 then delivers the packets from the intermediate socket connection-1 728 to the destination server-1 738. Similarly, packets being sent from the socket connection 710 of the applet A 706 are directed through the applet communication layer 712 to the intermediate socket connection-2 730 of the intermediate server 714 and then onto the destination server-2 740. Likewise, packets being sent by the socket connections 720, 722, and 724 from the applets 716 and 718 are directed by the applet communication layer 726 to the intermediate socket connections 732, 734 and 736, respectively, within the intermediate server 714. The intermediate socket connections 732, 734 and 736 then respectively deliver the packets to the corresponding destination servers 742, 744 and 746.

In one embodiment, the packets being transmitted include a header that identifies the socket connection and the browser hosting the socket connection. Using such information from the header, the intermediate server can determine the appropriate intermediate socket connection within the intermediate server 714 that is to handle the packets.

Optionally, the intermediate server can impose security on which destination servers the sockets for the applets are able to communicate with. Hence, the sockets of an applet can also be assigned a security identifier. The security identifier can be utilized to restrict the network locations that the socket is able to communicate with. For example, if the HTML page including an applet originated from xyz.com, when subsequent packets from the socket connection are sent to the intermediate server, the intermediate server can check the security identifier to determine which destination server the applet is permitted to communicate with. Hence, in one embodiment, the intermediate server can maintain a table of security identifiers and permitted network domains. For example, if the security identifier was associated with xyz.com, then packets to be sent to a domain jkl.com could be refused by the intermediate server. The security identifier can thus be used to enforce the network security described in the Java security specifications. In one implementation, the security can be implemented by bytecode modification discussed above, wherein the security identifier for each applet can be inserted into the bytecode.

The communication frameworks 600, 700 discussed above in FIGS. 6 and 7 make use of a pair of HTTPS connections between an applet communication layer (client) and an intermediate server (server). As a result, the data packets (or messages) from various browsers can be multiplexed and sent over one of the HTTPS connections, and the data packets (or messages) destined for various browsers can be commonly sent over another of the HTTPS connections and then delivered to the appropriate browser.

To assist the exchange of data packets (messages) flow control messages can also be sent between the applet communication layer and the intermediate server for flow control. If the intermediate server is sending too much data, the applet communication layer can inform the intermediate server to stop sending the data. This prevents the applet communication layer from being forced to buffer more than a limited amount of data. After at least a significant portion of the data being buffered in the buffers 628-632 of the applet communication layer 604 has been consumed by the corresponding applet(s), the applet communication layer can instruct the intermediate server to resume sending more data. This flow control can be useful because the sockets are being multiplexed across a single HTTPS connection in each direction.

Additionally, acknowledgement messages can also go back and forth between the applet communication layer and the intermediate server so that the intermediate server knows what data has actually been received by the applet communication layer. The use of acknowledgement messages can be beneficial as sometimes the long-lived HTTPS connection (the connection that the applet communication layer uses to read data from the intermediate server) can be dropped by an intermediate proxy if the connection is idle or open for an extended duration. To recover from this situation the intermediate server is capable of retransmitting any data that the applet communication layer did not receive because the intermediate server knows from the acknowledgements what data the applet communication layer did or did not receive.

It should be recognized that the amount of overhead involved in the dual-channel implementation (provided by the pair of HTTPS connections) can be significant. For example, the overhead can include acknowledgements, flow control messages, and the HTTP overhead for each transient HTTP request (sending data from client to server). Note that the browser can also perform HTTP keep-alives, so the underlying TCP connection from browser (namely, the applet communication layer) to intermediate server is kept open. The transient HTTP requests from client to server are thus able to avoid the expensive TCP handshake on every request.

The dual-channel implementation works in situations where the applet must talk through a proxy to reach the intermediate server. However in situations where the applet can connect directly to the intermediate server, the HTTP and acknowledgement/flow-control overhead can be avoided if the applet communication layer opens an SSL connection directly to the intermediate server. By opening a new TCP connection for each client socket connection (e.g., Neoteris-Socket) there is no longer any multiplexing of connections. Thus if the applet stops reading from a particular client socket connection, the data on the corresponding TCP connection will be unread and, due to the flow control built into TCP, the intermediate server will be unable to send any more data. Once the applet reads from data from the client socket connection, a read from the TCP connection can be performed, which permits the intermediate server to send more data. Here, there is no proxy in the middle that could drop connections, so the acknowledgements are not necessary.

Moreover, because opening a new SSL connection is expensive, it is desirable to keep an SSL connection open for as long as possible. If the applet opens a connection sends a small amount of data and then closes the connection, it is desirable to keep the underlying TCP and SSL connection open. This can be achieved by embedding special control messages in the data stream that indicate when the connection is being closed by the application. The TCP and SSL connections are kept around for a period of time (e.g., 1-5 minutes), so that if a new connection is needed the previous one can be reused. Here, the logic of the applet then is to first try a direct connection to the intermediate server. If that fails, or times out, the applet falls back to the "proxy friendly" method of communication that uses the pair of HTTPS connections.

Although the above-described embodiments refer to the use of a single intermediary server within an information retrieval system, it should be recognized that the information retrieval system can also include a plurality of intermediary servers. The various intermediary servers can individually receive requests from client machines and forward them to the appropriate servers and return responses back through the intermediary server to the client machine. By having multiple servers, not only can additional processing power be obtained, but load balancing, fault tolerance and localization issues can also be addressed.

The various aspects, features, embodiments or implementations of the invention described above can be used alone or in various combinations.

The invention is preferably implemented in software, but can be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A system for communicating between a client and a server through an intermediate server, said system comprising:
   a non-transitory computer-readable storage medium storing code that is executable to implement:
      a communication layer to transform one or more socket connections into a pair of unidirectional secure URL connections with the intermediate server; and
      an applet to create at least one socket connection with the communication layer to enable communication between the applet and the server via the pair of unidirectional secure URL connections with the intermediate server, the applet including applet bytecode having been modified by the intermediate server to redirect applet communications with the server through the intermediate server.

2. The system as recited in claim 1, where the applet communicates with the intermediate server using packets of data.

3. The system as recited in claim 2, where the packets include a header and data, and where the header includes at least a browser identifier and a socket identifier.

4. The system as recited in claim 1, where said communication layer comprises:
   an outgoing queue to buffer outgoing packets of data received from the at least one socket connection with said applet; and
   a sender thread that sends the packets of data stored in said outgoing queue to said intermediate server.

5. The system as recited in claim 1, where said communication layer comprises:
   a reader thread that receives packets of data sent from said intermediate server to said applet via said communication layer; and
   at least one incoming queue to buffer incoming packets of data received from said intermediate server.

6. The system as recited in claim 5, where said at least one incoming queue operatively connects with the at least one socket connection of said applet.

7. The system as recited in claim 1, where flow control messages are sent between said communication layer and said intermediate server.

8. The system as recited in claim 1, where said communication layer is to send acknowledgment messages to said intermediate server.

9. The system as recited in claim 1, where one of the pair of the unidirectional secure URL connections includes an outgoing unidirectional secure URL connection, and the other of the pair of the unidirectional secure URL connections includes an incoming unidirectional secure URL connection.

10. The system as recited in claim 9, where the outgoing unidirectional secure URL connection includes a transient connection.

11. The system as recited in claim 9, where the incoming unidirectional secure URL connection includes a persistent connection.

12. The system as recited in claim 1, where said communication layer includes an applet communication layer.

13. A system for communicating between a client and a server via an intermediate server, said system comprising:
   a non-transitory computer-readable storage medium storing code that is executable to implement:
      a communication layer, and
      one or more applets to create at least one socket connection with the communication layer, the one or more applets including applet bytecode having been modified by the intermediate server to redirect applet communications with the server through the intermediate server, where
      the communication layer is to transform the at least one socket connection into a pair of unidirectional URL connections with the intermediate server to enable the one or more applets to communicate with the server via the pair of unidirectional URL connections with the intermediate server.

14. The system as recited in claim 13, where the pair of unidirectional URL connections include secure connections.

15. The system as recited in claim 13, where the pair of unidirectional URL connections include HTTPS connections.

16. The system as recited in claim 13, where one of the pair of unidirectional URL connections includes a transient connection, and the other of the pair of unidirectional URL connections includes a persistent connection.

17. A system for communicating between a client and a server via an intermediate server, said system comprising:
   a non-transitory computer-readable storage medium storing code that is executable to implement:
      a communication layer, and
      one or more applets to create at least one socket connection with the communication layer, the one or more applets including applets bytecode having been modified by the intermediate server to redirect applet communications with the server through the intermediate server, where
      the communication layer is to:
         establish an intermediate socket connection with the intermediate server to enable communication between the one or more applets and the server over the intermediate socket connection when the intermediate socket connection can be established and to transform said at least one socket connection into a pair of unidirectional URL connections with the intermediate server to enable communication between the one or more applets and the server over the pair of unidirectional URL connections when the intermediate socket connection cannot be established.

18. A method for communicating between a client and a server via an intermediate server, said method comprising:
   creating at least one socket connection between one or more applets and a communication layer, the one or more applets including applet bytecode having been modified by the intermediate server to redirect applet communications with the server through the intermediate server; and
   transforming the at least one socket connection into a pair of unidirectional URL connections with the intermediate server to enable the one or more applets to communicate with the server via the pair of unidirectional URL connections with the intermediate server.

19. The method of claim 18, wherein the pair of unidirectional URL connections include secure connections.

20. The method of claim 18, wherein the pair of unidirectional URL connections include HTTPS connections.

21. The method of claim 18, where one of the pair of unidirectional URL connections includes a transient connection, and the other of the pair of unidirectional URL connections includes a persistent connection.

* * * * *